Jan. 25, 1966    C. H. SUMP ETAL    3,231,341
METAL-PLASTIC ARTICLE
Filed May 26, 1960
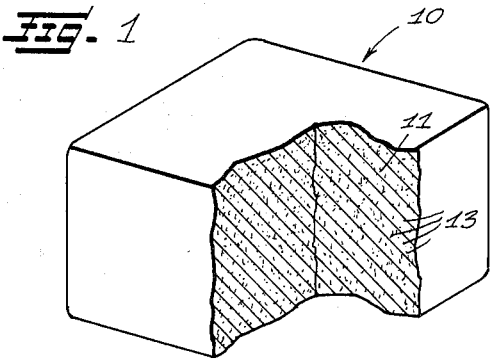
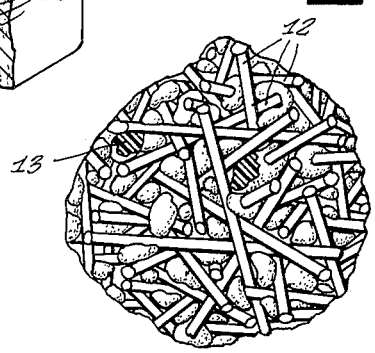
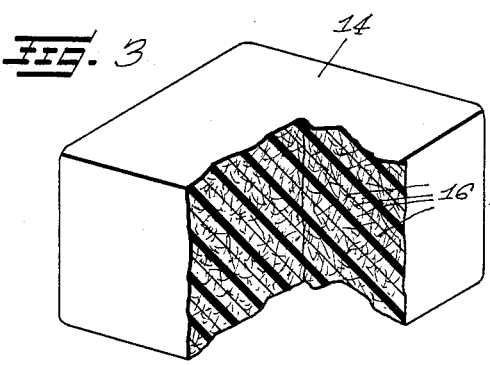
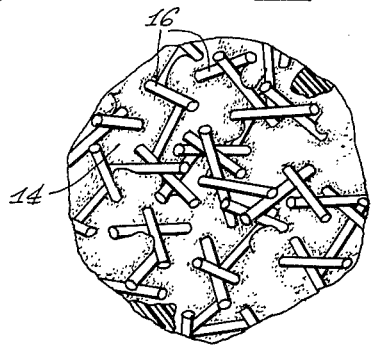
Inventors
CORD H. SUMP
ARTHUR G. METCALFE
WALTER C. TROY
By Hill, Sherman, Meroni, Gross & Simpson Attys United States Patent Office 3,231,341
Patented Jan. 25, 1966

3,231,341
METAL-PLASTIC ARTICLE
Cord H. Sump and Arthur G. Metcalfe, Park Forest, Ill., and Walter C. Troy, Riverside, Calif., assignors to IIT Research Institute, a corporation of Illinois
Filed May 26, 1960, Ser. No. 31,911
6 Claims. (Cl. 29—180)

This is a continuation-in-part of application Serial No. 559,932 filed January 18, 1956, now abandoned.

The present invention is directed to compositions containing organic or inorganic polymers and metal fibers, and also to methods involved in the preparation of said compositions.

Compositions of the present invention, by suitable adjustment of the relative amounts of the polymer and the metal fibers, and by selection of particular polymers and particular metals, can be provided with widely differing properties to suit various needs.

One of the embodiments of the present invention involves the preparation of a skeleton from metal fibers in which the fibers are in three-dimensional random orientation. This type of skeleton has a controllable porosity which may be extremely high, thereby providing a substantial number of pores within the skeleton, or it may be so low as to approach the theoretical density of the metal involved. This skeleton may then be impregnated with a solution, melt, or suspension of the polymer or its formulating constituents so that the pores of the end product are fully or partially filled by the polymer. With this type of structure, the impregnated skeleton is improved in several ways: first, the metal skeleton, having its fibrous structure restrained from deformations such as buckling, is very considerably strengthened; second, with relatively small volume percentages of metal, the polymer itself can be strengthened considerably without greatly altering its basic nature and desirable characteristics; third, combinations of the properties of the metals and the polymers have applications in cases where a material with a particular thermal or electrical conductivity is desired, or where a combination of strength and abrasion resistance is sought, or where a combination of lubricating tendency and compression resistance is sought.

Still another embodiment of the invention involves incorporating discrete metal fibers in random orientation within a body of the organic polymer. In this instance, the basic attributes of the polymer are retained and the fibers, which may be connected by bonding or unconnected, are relatively uniformly distributed through the mass to contribute substantial reinforcement for the mass, resistance to abrasion, improved electrical conductivity and other desirable properties. This type of structure is particularly useful as a substitute for polymers which have heretofore been reinforced by introducing glass fibers within the body of the polymer. The inclusion of such fibers in the form of yarns or fabrics within the polymer is sometimes undesirable because the glass has a very low extensibility, is electrically non-conductive, and has a very low resistance to shattering upon shock.

An object of the present invention is to provide an improved combination of a polymer and metal fibers.

A further object of the invention is to provide a structure having excellent bearing properties from the combination of a fiber metal skeleton and a polymer impregnant.

A further object of the invention is to provide improved polymer compositions containing fiber metal reinforcements.

A still further object of the invention is to provide improved methods for the manufacture of polymer impregnant fiber metal skeletons.

A further object of the invention is to provide an improved method for the manufacture of metal fiber reinforced polymers.

At the outset, it should be explained that the combination between the metallic fibers and the polymer does not depend upon chemical reactivity between the two classes of agents, so the present invention is generally applicable to all types of metal fibers and to all types of organic or inorganic polymers.

By the term "fiber" as used in this specification and claims, we mean an elongated metallic element having a long dimension substantially greater than its mean dimension in cross-section. As a general rule, a fiber should have a length of at least ten times its mean dimension in cross-section. The term "mean dimension in cross-section" is related to the shape of the fiber in cross-section, and refers to the diameter of the cross-section in the case of a circular filament, or in the case of a rectangular ribbon, denotes one-half the sum of the short side and the long side of the rectangle.

While the actual dimensions of the fibers may vary considerably, depending upon the ultimate use to which the article is to be put, particularly good results have been achieved through the use of metal fibers having a mean dimension in cross-section ranging from about 0.00025 inch to 0.010 inch, and with lengths varying from about 0.002 inch to 2 inches. The lengths of the fibers for any given application will depend to a large extent upon the nature of the article desired. At the minimum end, the length is chosen, as mentioned above, so that it is at least ten times the mean dimension of the fiber in cross-section. The maximum length is governed to some extent, particularly when the fibers are to be employed in the form of a self-sustaining skeleton, by the process employed for their consolidation. One of the most convenient means for depositing a random orientation of metal fibers is by deposition from suspension in a liquid or gas. The metallic fibers are deposited from such suspension, in a manner similar to the deposition of paper fibers from pulp suspensions, by applying a reduced pressure onto a foraminous forming surface and depositing the suspension of metal fibers on the forming surface. As the suspending medium (usually oil, glycerine, or water) is withdrawn, a mat is laid down on the forming surface in which the fibers appear in a three-dimensional random orientation. With this type of forming process, the maximum length for the fibers will be determined to a large extent by the suspendability of the fibers in the particular medium and to some extent by the dimensions of the finished article. That is to say, the fibers should not be so long that they settle out of the suspension very rapidly. Nor should they be so long that they exceed the maximum dimension of the article which is being produced as otherwise the fibers would have to be bent back upon themselves and many of the desirable physical properties possessed by the fiber metal skeleton would be lost. In this connection, it should be noted that the fibers employed in the preparation of fiber metal skeletons are not the same as the filaments comprising metal wool. The filaments employed in wool manufacture are extremely long; a length of many feet for a given stand is not unusual. However, when such materials are assembled for compression and sintering, the lack of randomness inherent in such a structure results in the production of areas having excessively high metal concentrations and other areas containing large pores of uncontrollable size. The compacts which result are necessarily anisotropic. In contrast, the fiber metal compacts employing true fibers, as discussed in the foregoing description, can be formed into masses of controlled, uniform porosity. This unique structure results in the attainment of substantially isotropic strength and density properties.

Another method for preparing the skeleton consists in forming a slurry of the metal fibers, introducing the slurry into a porous mold, and applying suction to the walls of the mold to withdraw the suspending medium and leave a mat of fibers in random orientation.

Still another method involves simply dropping dry fibers into a shaping mold and applying sufficient forming pressure to shape the fibers into the physical form desired and produce some cold welded junctions between the fibers.

Examples of metal which can be employed are ferrous alloys, lead, nickel, molybdenum or any metal which can be reduced to the form of fibers.

The polymer which may be employed is chosen from any of the polymers whether thermoplastic or thermosetting, elastomeric or non-elastomeric, natural or synthetic. Purely by way of example, we may mention the inorganic plastics such as glass-bonded mica, the cellulose derivatives such as the cellulose ethers and esters, resins such as vinyl resins, polyethylene, polystyrene, methacrylates, and the like, phenol-formaldehyde resins, urea-formaldehyde resins, silicone resins, melamine-formaldehyde resins, epoxy resins, polyester resins, linear polyamides such as nylon, natural rubber, gutta-percha, rubber latex, and synthetic rubbers such as butadiene-styrene, butadiene-acrylonitrile, and the like.

Where the particular metal employed does not exhibit good adhesion to the particular polymer, the invention contemplates that the metal fibers may be pre-sized or coated with suitable agents to improve the adhesion. For example, a nitrocellulose lacquer may be used as a sizing for metals that tend to oxidize, and such lacquer is applied first to the metal fibers and the solvent is then evaporated. Another sizing agent suitable for the purposes is a resorcinolformaldehyde latex. For thermosetting resins, a suitable size is a melamine formaldehyde acid colloid which is applied to the metallic fibers and then partly cured.

The relative proportions between the metal fibers and the polymer will vary considerably, depending upon the ultimate use to which the article is put. Thus, the amount of the metallic constituent may vary from 3% to 90% by volume and the polymer may constitute the remaining 10 to 97% by volume. For the manufacture of bearings and the like, it is preferable to employ a ratio of 50 to 80% by volume of the metal fiber network and 20 to 50% by volume of the polymer.

In the form of the invention in which the metal fibers are incorporated into a matrix of the polymer, the relative proportion of the fibers may be considerably lower. Thus, the metal fiber content of such compositions may range from about 1% by volume to about 70% by volume.

A further description of the present invention will be made in conjunction with the attached sheet of drawings which illustrates several embodiments thereof.

In the drawings:

FIGURE 1 is a view in perspective of a composition including a fiber metal skeleton having a polymeric impregnant, the showing being broken away to illustrate the interior thereof;

FIGURE 2 is a greatly enlarged view of the physical structure of the element shown in FIGURE 1;

FIGURE 3 is a view similar to FIGURE 1, but illustrating that type of structure in which the polymer forms the continuous phase, and the metal fibers are incorporated within the polymer; and FIGURE 4 is a greatly enlarged view of the physical structure shown in FIGURE 3.

As shown on the drawings:

In FIGURE 1, reference numeral 10 indicates generally a type of composition particularly useful for the manufacture of bearings. It includes a fiber metal skeleton 11 composed of individual fibers 12 (FIGURE 2) bonded together at their points of overlapping by means of metal-to-metal bonds. This bonding may be accomplished, for example, by sintering the composition at temperatures on the order of 100 to 200° F. below the melting point of the metal involved. Alternatively, the metal-to-metal bonds may be created by pre-coating the fibers with a brazing composition, and heating the coated fibers to melt the brazing metal and cause it to flow to the junctures of the fibers. Upon cooling, the brazing metal bonds the fibers at their junctures to form a self-sustaining skeleton.

It will be observed that the network of FIGURE 2 consists of a mass of randomly oriented, discrete metallic fibers in sufficient number so that a given fiber makes contact with a substantial number of adjoining fibers. It should also be noted that the length of the individual fibers constitute only a small fraction, usually less than one third of the major dimension of the skeleton in which they are included.

The polymer infiltrant is represented at reference numeral 13 in FIGURE 2 and, as seen from that figure, serves to fill up the voids, at least partly, existing in the naturally porous skeleton 11.

The polymer may be incorporated into the metallic skeleton by any of a variety of methods. Those polymers which are soluble in an organic solvent may be applied to the skeleton in liquid solution so that upon evaporation of the solvent, the solidified particles remain in the interstices of the skeleton. Polymers which are readily liquefiable by heat may be added in molten form and cooled to cause solidification of the particles within the pores of the skeleton. The particles may also be introduced in solid phase by employing a dispersion of the polymeric particles in a suitable liquid carrier.

In the type of structure shown in FIGURES 3 and 4 of the drawings, the continuous phase of the composition is a body 14 composed of the polymer. A mass of discrete fibers 16, either sintered or unsintered provides a reinforcement for the polymeric body 14 as well as providing it with electrical conductivity and greater abrasion resistance.

While the manufacture of bearing elements forms an important part of this invention, the invention by no means is limited to that field. A material suitable for use as a sheet material for covering airplane wing sections can be produced by employing a composition containing about 25 to 50% by volume of a metallic skeleton, and the balance being the polymer material. Sealing members such as gaskets adapted to resist fluid pressure can be prepared by including a skeleton containing about 10 to 80% by volume of metal and the balance being a suitable polymer.

Another field of application for the compositions of the present invention, because of their unique electrical properties, is the field of static electricity discharging devices. For example, the compositions of the present invention may be employed as grounding straps, floor coverings, or chair coverings in which the function of the metal is to convey the electrical charge normally accumulated on the polymer by reason of friction. In this type of composition, the percentage of metal may vary from a few percent to about 90% by volume.

The controllable heat conductivity characteristics of the compositions of the present invention make it possible to include the metal fibers in a mass of thermosetting resin, particularly in large sections, to facilitate curing of the resin by the application of heat.

The following specific examples illustrate several types of compositions which can be produced according to the present invention.

EXAMPLE I

A material suitable for use as a liquid seal was prepared by providing stainless steel fibers having an average diameter of 2 mils and an average length of threeeighths inch, the fibers having been compacted into a coherent mass and sintered at a temperature of about 2200° F. to strengthen the mass. The diameter of the skeleton was about 2 inches. Fifteen parts by volume of the skeleton were combined with 85 parts by volume of polytetrafluoroethylene resin by impregnating the skeleton with a liquid solution of the resin. The seal which resulted had excellent strength characteristics and resistance to fluid flow.

EXAMPLE II

Another seal member was prepared by compacting and sintering stainless steel fibers of the type described in Example I, and employing, in the final composition, 80% by volume of the compacted fiber mass and 20% by volume of Teflon (polytetrafluoroethylene). This type of composition is particularly useful for high pressure seals.

EXAMPLE III

Suitable bearing members were prepared from bronze fibers having diameters ranging from 2 to 10 mils and lengths up to one inch. The bronze fibers were consolidated and sintered at a temperature in the range from about 1400 to 1500° F. The resulting bronze fiber skeleton was infiltrated with nylon in proportion sufficient to yield a final product which contained 60% by volume of the metal and 40% by volume of nylon.

We claim as our invention:

1. A metal-plastic article comprising a mass of metallurgically bonded metallic filaments each having a length of about 0.002 to 2 inches, a mean dimension in cross-section ranging from about 0.00025 to 0.010 inch, said length being at least 10 times said mean dimension in cross-section, said mass being impregnated with a resinous polymer, the mass of bonded metallic filaments constituting from about 3% to about 90% by volume, and said polymer constituting from about 10% to about 97% by volume of said article.

2. The article of claim 1 in which the mass of bonded metallic filaments constitutes from 50 to 80% by volume, and said polymer constitutes from about 20 to 50% by volume of said article.

3. A dimensionally rigid plastic article comprising a thermoset consolidated mass of a mat of metallurgically-bonded metallic filaments in a matrix derived from a thermosetting resin selected from the group consisting of phenol-formaldehyde resins, urea-formaldehyde resins, melamine-formaldehyde resins, epoxy resins, and polyester resins, said mat of metallic filaments having substantially uniform porosity and substantially isotropic strength and density properties, said mat being composed of metallic filaments each having a length of about 0.002 to 2 inches, a mean dimension in cross-section ranging from about 0.00025 to 0.010 inch, said length being at least 10 times said mean dimension in cross-section, said matrix containing a sufficient quantity of said filaments to improve the thermal conductivity of said article materially.

4. The plastic article of claim 3 wherein a thermosetting epoxy resin is used.

5. The plastic article of claim 3 wherein a sintered mat of steel filaments is used.

6. The plastic article of claim 5 wherein the proportion of steel filaments is within the range from about 3 to about 90% by volume and the proportion of said resin is in the range from about 10 to about 97% by volume.

References Cited by the Examiner

UNITED STATES PATENTS

| | | | |
|---|---|---|---|
| 853,003 | 5/1907 | Collins | 29—192 |
| 1,620,530 | 3/1927 | Eield | 29—149.5 |
| 2,099,047 | 11/1937 | Bradshow | 260—83.5 |
| 2,197,916 | 4/1940 | Balfe | 29—191.4 |
| 2,320,313 | 5/1943 | Thomas | 117—232 |
| 2,663,928 | 12/1953 | Wheeler | 29—149.5 |
| 2,691,814 | 10/1954 | Tait | 29—195 |
| 2,785,090 | 3/1957 | Kirk | 117—132 |
| 2,785,383 | 3/1957 | Foster | 117—232 |
| 2,844,559 | 7/1958 | Parker | 117—232 |
| 2,873,466 | 2/1959 | Bigelow | 117—1323 |

OTHER REFERENCES

"Fiber Metals" by Metcalfe and Sump, published Materials and Methods, November 1955, pp. 96–98.

"Fiber Metallurgy," Metcalfe, Sump, Troy; March 1955, Metal Progress, pp. 81–84.

"Fibers Enter Metal Field," Chemical Engineering News, October 17, 1955, p. 4404.

DAVID L. RECK, Primary Examiner.

WHITMORE A. WILTZ, HYLAND BIZOT, Examiners.